United States Patent
Abbott et al.

(10) Patent No.: US 6,567,577 B2
(45) Date of Patent: *May 20, 2003

(54) METHOD AND APPARATUS FOR PROVIDING CHROMATIC DISPERSION COMPENSATION IN A WAVELENGTH DIVISION MULTIPLEXED OPTICAL TRANSMISSION SYSTEM

(75) Inventors: Stuart M. Abbott, Marlboro, NJ (US); Neal Bergano, Lincroft, NJ (US); Stephen G. Evangelides, Red Bank, NJ (US); Ekaterina Golovchenko, Colts Neck, NJ (US); George Harvey, Princeton, NJ (US); Franklin W. Kerfoot, III, Red Bank, NJ (US); Chinlon Lin, Holmdel, NJ (US); Bo Pedersen, Rumson, NJ (US)

(73) Assignee: Tyco Telecommunications (US) Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/113,923

(22) Filed: Jul. 14, 1998

(65) Prior Publication Data

US 2001/0003549 A1 Jun. 14, 2001

(51) Int. Cl.$^7$ ............................. G02B 6/28; H04J 14/02
(52) U.S. Cl. ............................ 385/24; 27/31; 359/124; 359/161

(58) Field of Search .............................. 385/24, 27, 31; 359/341.1, 161, 109, 174, 154, 124

(56) References Cited

U.S. PATENT DOCUMENTS

| | | | | |
|---|---|---|---|---|
| 5,473,719 A | * | 12/1995 | Stone | 385/123 |
| 5,629,795 A | * | 5/1997 | Suzuki et al. | 359/337 |
| 5,956,440 A | * | 9/1999 | Mikami et al. | 385/24 |
| 6,005,702 A | * | 12/1999 | Suzuki et al. | 359/183 |
| 6,021,235 A | * | 2/2000 | Yamamoto et al. | 385/24 |
| 6,137,604 A | * | 10/2000 | Bergano | 385/24 |

* cited by examiner

Primary Examiner—Rodney Bovernick
Assistant Examiner—Juliana K. Kang

(57) ABSTRACT

A WDM optical communication system is provided that includes a transmitter and a receiver. An optical fiber transmission path couples the transmitter to the receiver. The transmission path includes at least one repeater having an optical amplifier located therein. A dispersion compensator is disposed at an intermediate point along the transmission path. The intermediate point is located outside of the repeater. The compensator includes a wavelength routing device for dividing a signal having a prescribed bandwidth into a plurality of distinct sub-bands. A plurality of output paths is provided for respectively receiving the plurality of distinct sub-bands. The dispersion compensator also includes a dispersion compensating optical element coupled to each of the output paths. Each dispersion compensating optical element substantially compensates for dispersion at a prescribed wavelength within the bandpass of its respective sub-band. A coupler recombining the distinct sub-bands and couples them back onto the optical fiber transmission path.

14 Claims, 7 Drawing Sheets

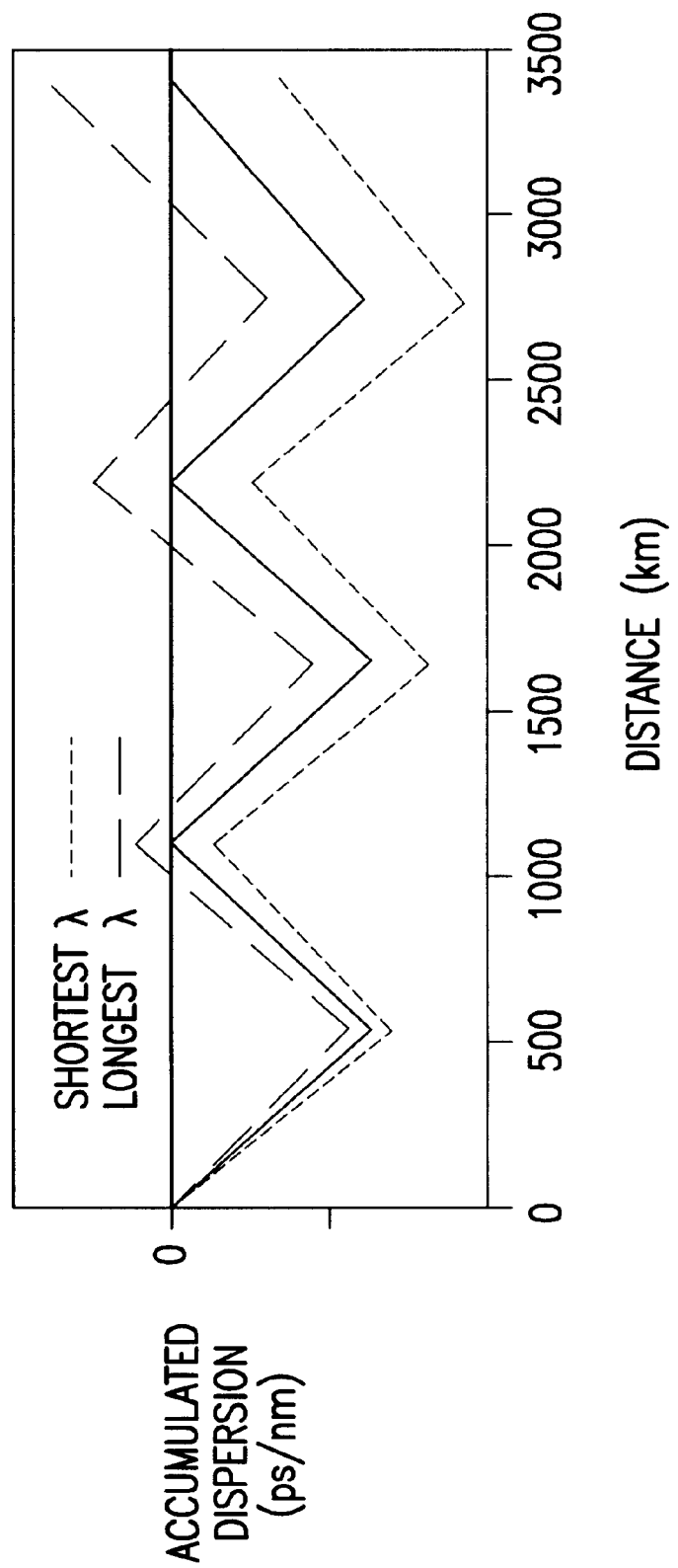

METHOD AND APPARATUS FOR PROVIDING CHROMATIC DISPERSION COMPENSATION IN A WAVELENGTH DIVISION MULTIPLEXED OPTICAL TRANSMISSION SYSTEM

RELATED APPLICATIONS

This application is related to U.S. patent application Ser. No. 08/759,493, now U.S. Pat. No. 6,137,604 entitled "Chromatic Dispersion Compensation in Wavelength Division Multiplexed Optical Transmission Systems."

FIELD OF THE INVENTION

The invention relates to the optical transmission of information and, more particularly, to a method and apparatus for compensating for chromatic dispersion that accrues over optical fiber transmission systems.

BACKGROUND OF THE INVENTION

The availability of high performance optical amplifiers such as the Erbium-Doped Fiber-Amplifier (EDFA) has renewed interest in the use of wavelength division multiplexing (WDM) for optical transmission systems. In a WDM transmission system, two or more optical data carrying channels are combined onto a common path for transmission to a remote receiver. Typically, in a long-haul optical fiber system, the set of wavelength channels would be amplified simultaneously in an optical amplifier based repeater. The Erbium-Doped Fiber-Amplifier is particularly useful for this purpose because of its ability to amplify multiple wavelength channels without crosstalk penalty.

Typically, it is advantageous to operate long-haul transmission systems at high data rates per channel. For example, useful data rates include multiples of the Synchronous Digital Hierarchy (SDH) standard, i.e., 2.5 and 10 Gb/s. While both 2.5 and 10 Gb/s are available, in many applications it is desirable to operate at the highest standard bit rate possible. This lowers the cost and physical dimensions of the terminal equipment. For example, a transmission system with a capacity of 160 Gb/s would require 64 2.5 Gb/s transmitters/receiver pairs, whereas a system based on 10 Gb/s would only require 16 10 Gb/s pairs of terminal equipment. Unfortunately, as the transmission bit rates are increased, so do the transmission penalties associated with the transmission fiber's chromatic dispersion and nonlinear index of refraction. It has been found both experimentally and by simulations that by using a combination of dispersion management techniques and distortion tolerant transmission formats, 10 Gb/s channels can be transmitted successfully over transoceanic distances over a limited range of wavelengths.

One of the more important parameters that limit the usable wavelength space is the so-called "dispersion slope", or "higher order" dispersion of the transmission fiber. The dispersion slope causes each WDM channel to experience a slightly different amount of dispersion. The efficacy of the dispersion mapping technique, reviewed by Forghieri et al., (Chapter 8 in *Optical Fiber Telecommunications IIIA*, Academic Press 1997) is limited because the amount of dispersion that occurs in a typical optical fiber depends on the operating wavelength that is employed. That is, only one given wavelength can operate at average zero dispersion. Accordingly, because of this characteristic of the dispersion slope, the various channels employed in a WDM system cannot all operate at the wavelength of average zero dispersion. This limitation can be overcome to a limited degree by using individual channel dispersion compensation at the receiver. However, since these systems are subject to nonlinear penalty, the ability to correct for the non-zero dispersion at the receiver terminal is limited. Thus, channels located far from the average zero dispersion wavelength can experience large amounts of distortion.

SUMMARY OF THE INVENTION

In accordance with the present invention, a method and apparatus is provided for managing dispersion in a WDM optical transmission systems so that transmission performance is improved using a so-called "split-band" dispersion management scheme. The split-band scheme is accomplished by providing select repeaters that can divide the WDM channels into two (or more) bands. All the WDM channels enter the first select repeater on a common fiber. The select repeaters are followed by sections of transmission cable having therein twice (or more) the usual number of optical fibers. These cable sections allow the bands to experience differing amounts of chromatic dispersion. The WDM channels are then re-combined onto a common fiber. Since in this arrangement differential dispersion is provided in an actual section of transmission cable rather than in a repeater, it is particularly efficient in terms of excess loss.

In one particular embodiment of the invention, a WDM optical communication system is provided that includes a transmitter and a receiver. An optical fiber transmission path couples the transmitter to the receiver. The transmission path includes at least one repeater having an optical amplifier located therein. A dispersion compensator is disposed at an intermediate point along the transmission path. The intermediate point is located outside of the repeater. The compensator includes a wavelength routing device for dividing a signal having a prescribed bandwidth into a plurality of distinct sub-bands. A plurality of output paths is provided for respectively receiving the plurality of distinct sub-bands. The dispersion compensator also includes a dispersion compensating optical element coupled to each of the output paths. Each dispersion compensating optical element substantially compensates for dispersion at a prescribed wavelength within the bandpass of its respective sub-band. A coupler recombining the distinct sub-bands and couples them back onto the optical fiber transmission path.

BRIEF DESCRIPTION OF THE DRAWING

FIG. 8 shows an example of the dispersion map that may be used for a transmission system employing the dispersion compensator shown in FIG. 5.

DETAILED DESCRIPTION

Figure 1:
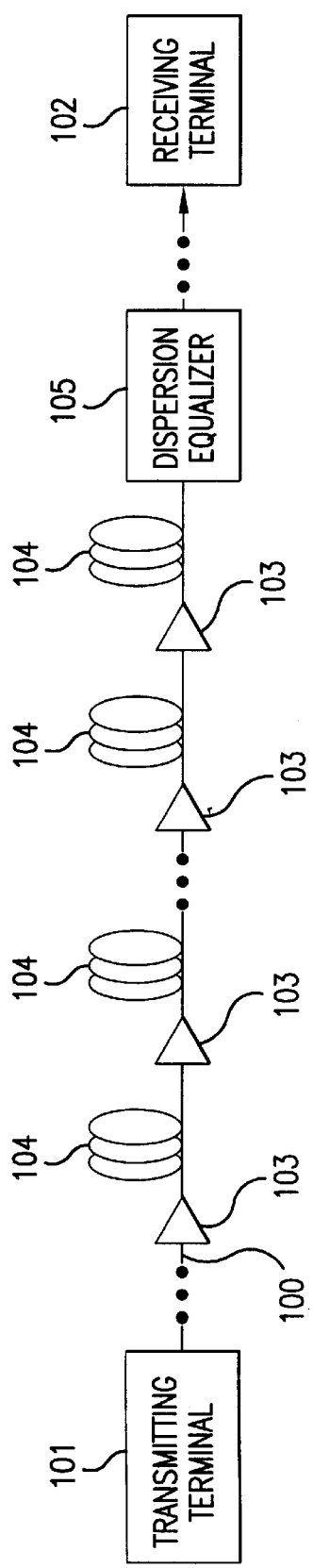
FIG. 1 shows a simplified block diagram of an optical fiber transmission system in accordance with the present invention.

FIG. 1 shows a simplified block diagram of an exemplary optical fiber transmission system in accordance with the present invention. The system includes an optical transmission path 100, a transmitting terminal 101, and a receiving terminal 102. While only a single transmission path is shown, one of ordinary skill in the art will recognize that a second path may be employed to support bi-directional communication. The transmitting terminal 101 provides an optical data signal that is to be transmitted to the remote receiving terminal via the optical fiber transmission path 100. The optical signal presented by the terminal 101 to the transmission path 100 may comprise a plurality of WDM optical carriers each carrying an SDH signal. FIG. 1 shows a section of the amplified transmission path consisting of optical amplifiers 103, spans of transmission fiber 104, and dispersion compensator 105. In a typical long-haul system, this series of components constituting the dispersion map period might be repeated a number of times over the length of the system. The optical amplifiers 103 may be EDFAs, for example, which amplify optical signals in the 1550 nm wavelength band. In undersea communication systems a pair of such optical amplifiers supporting opposite-traveling signals is housed in a single unit known as a repeater. In one embodiment of the invention the transmission fibers 104 may be dispersion-shifted single-mode fibers with an average zero dispersion wavelength higher than the operating wavelengths of the system. For example, the transmission fiber in 104 may be similar to those used in Bergano et al. (OFC'98 Post deadline paper PD12, San Jose Calif., February 1998.), in which the transmission fiber had an average dispersion of −2.5 ps/km-nm and a dispersion slope of about 0.09 ps/km-nm². The fiber spans disclosed therein are a hybrid combination of large mode fiber and TRUEWAVE®MINUS™ fiber available from Lucent Technologies. This combination achieves an adequate trade-off between a decrease in the nonlinear effects resulting from using a large mode fiber and a reduction in dispersion slope found in the large mode fiber.

A simple linearized chromatic dispersion relationship between the signal wavelength $\lambda_{sig}$ and the dispersion D is given in equation 1:

$$D = SL(\lambda_{sig} - \lambda_0) \quad (1)$$

where the dispersion D is measured in units of ps/nm, the dispersion slope S is measured in units of ps/km-nm², and the average zero dispersion wavelength $\lambda_0$ of the transmission fiber is measured in units of nm. As equation 1 clearly indicates, the point of minimum dispersion only occurs at one particular wavelength $\lambda_0$. Accordingly, as disclosed in U.S. Pat. No. 5,559,920, if a set of WDM channels were transmitted along the transmission path 100, a dispersion compensating fiber could only translate one channel back to the zero dispersion wavelength. The remaining channels would accumulate dispersion. As previously noted, this problem can be alleviated with individual channel dispersion compensation at the receiver; however, since these systems are subject to nonlinear penalty, the ability to correct for the non-zero dispersion at the receiver terminal is limited. Thus, to transmit the channels with low dispersion penalty, there is an upper bound on the maximum amount of accumulated dispersion that each channel can tolerate, which is bit rate dependent. As the bit rate of each channel is increased, the allowable amount of accumulated dispersion per channel is reduced. This problem is overcome by the dispersion compensator shown in FIG. 2.

Figure 2:
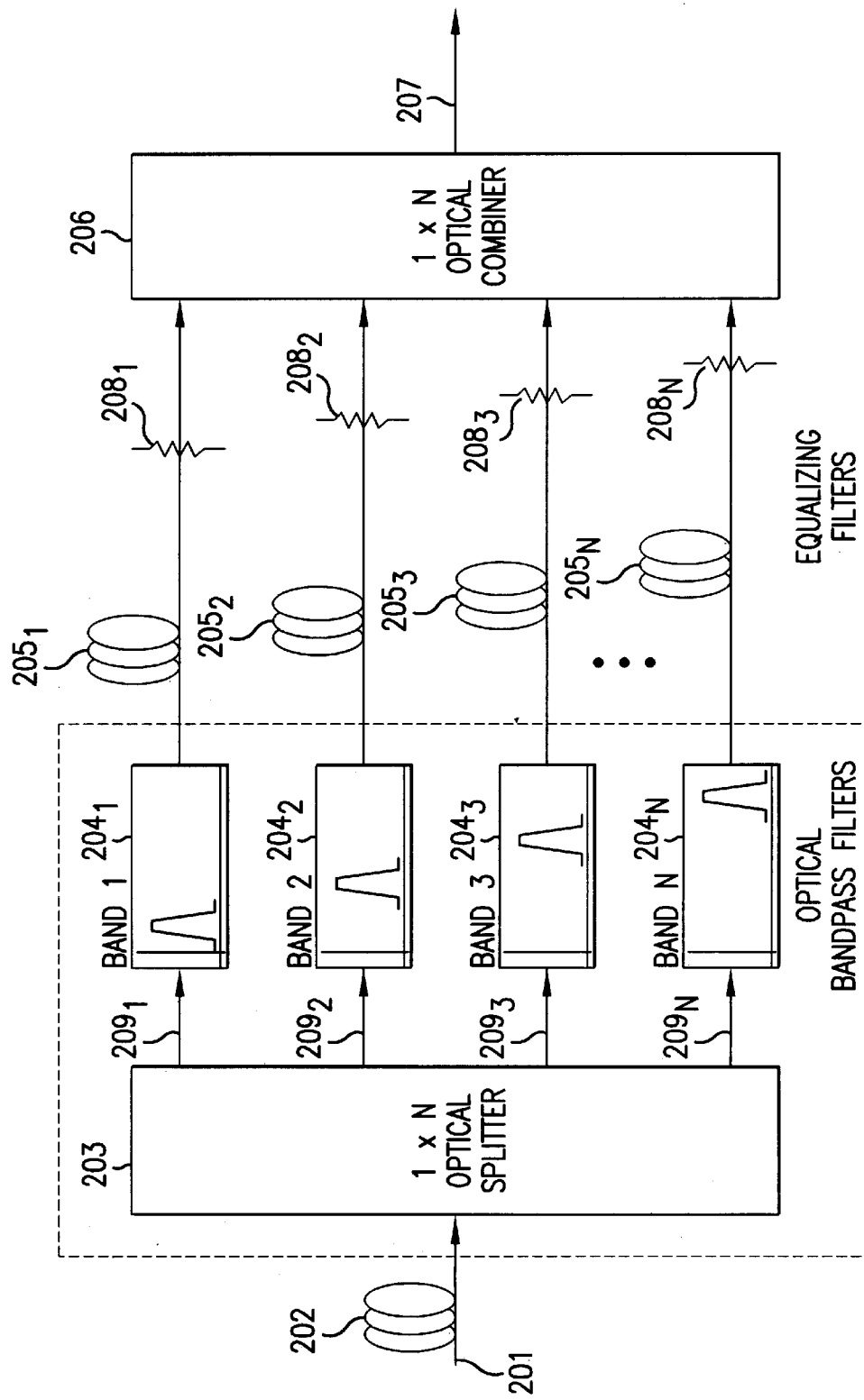
FIG. 2 shows a simplified block diagram of one embodiment of the dispersion compensator shown in FIG. 1.

FIG. 2 shows one embodiment of the chromatic dispersion compensator 105 constructed in accordance with the present invention. In operation, the dispersion compensator first splits the bandwidth of the optical signals traversing the optical amplifiers 103 into a series of bands, equalizes the dispersion of each band individually, and finally recombines the signals onto a common path for continued transmission. In FIG. 2, the signals reach the compensator on fiber path 201 and enter an optional first dispersion compensating fiber 202. The signals next enter a 1×N optical splitter 203, which divides the power of the optical signal onto output paths $209_1, 209_2, 209_3, \ldots 209_N$. The signals propagating along the N output paths respectively enter optical band-pass filters $204_1, 204_2, 204_3, \ldots 204_N$ with a center wavelength of $\lambda_1, \lambda_2, \lambda_3, \ldots \lambda_N$, respectively. The optical bandpass filters 204 separate the usable bandwidth into N distinct bands. In a preferred embodiment of the invention the wavelengths transmitted by the bandpass filters 204 do not overlap one other and have sufficient extinction in their stop-bands so that when the bands are recombined in coupler 206, any interference effects will be sufficiently small to avoid adversely impacting the system's performance. The signals emerging from bandpass filters $204_1, 204_2, 204_3, \ldots 204_N$ each enter a respective dispersion equalizing fiber $205_1, 205_2, 205_3, \ldots 205_N$ and possibly loss elements $208_1, 208_2, 208_3, \ldots 208_N$. The signals are subsequently recombined in coupler 206 before exiting the dispersion compensator on fiber 207. The dispersion in each of the plurality of compensating fibers $205_1, 205_2, 205_3, \ldots 205_N$ is selected so that the average chromatic dispersion of the concatenated transmission spans 104 upstream from the dispersion compensator 105 and the equalizing sections 202 and 205 are substantially returned to zero at each of the center wavelengths $\lambda_N$.

Compensating fiber 202 is optionally provided as a potential cost saving step to perform any dispersion compensation that is required by all of the N wavebands. For example, if the required amount of dispersion compensation ranged from −1000 ps/nm for band 1 to −500 ps/nm for band N, equalizing fiber 202 advantageously may provide −500 ps/nm of dispersion, which is required by each of the N wavebands. Accordingly, the amount of equalizing dispersion needed in the plurality of fibers $205_1, 205_2, 205_3, \ldots 205_N$ would range from −500 ps/nm to 0 ps/nm. The equalizing fiber 202 may be directly incorporated into the transmission path itself, thus yielding a significant cost savings. For example, the equalizing fiber 202 may be an extension of the cable defining the transmission path.

The dispersion compensation scheme shown in FIG. 2 is used to equalize the differential dispersion over a plurality of N wavebands, which results from the dispersion slope of the transmission fiber. The differential dispersion needed to accomplish this task is provided by the plurality of fibers $205_i$.

When provided, the loss elements $208_1, 208_2, 208_3, \ldots 208_N$ facilitate the equalization of the gain for the respective N wavebands. For example, an EDFA-based transmission system may require some degree of gain equalization when employed in wide-band applications. The loss elements $208_1, 208_2, 208_3, \ldots 208_N$ may be selected to equalize the received signal-to-noise ratio of the transmitted WDM channels in the N wavebands.

In the embodiment of the invention shown in FIG. 2 the equalizing elements 202 and 205 are single-mode fibers. Of course, those of ordinary skill in the art will recognize that many other optical devices may be employed to provide the necessary dispersion compensation. For example, fiber diffraction gratings may be used instead of single-mode fibers. One advantage accruing from the use of a fiber diffraction grating is that the slope of the dispersion characteristic as well as the dispersion itself may be appropriately adjusted. If compensating elements 205 comprise single-mode fibers having equal dispersions per unit length, the resulting propagation delay for the different bands would be different. If this posed any system problems, the propagation delays could be equalized by constructing equalizing fibers having differing dispersions per unit length. In this manner the required dispersion compensation is provided while equalizing the propagation length for all the bands. In addition, while it might be advantageous to completely equalize the differential dispersion caused by the dispersion slope of the transmission fiber, in some circumstances it may be sufficient to only partially compensate for this dispersion.

Figure 3:
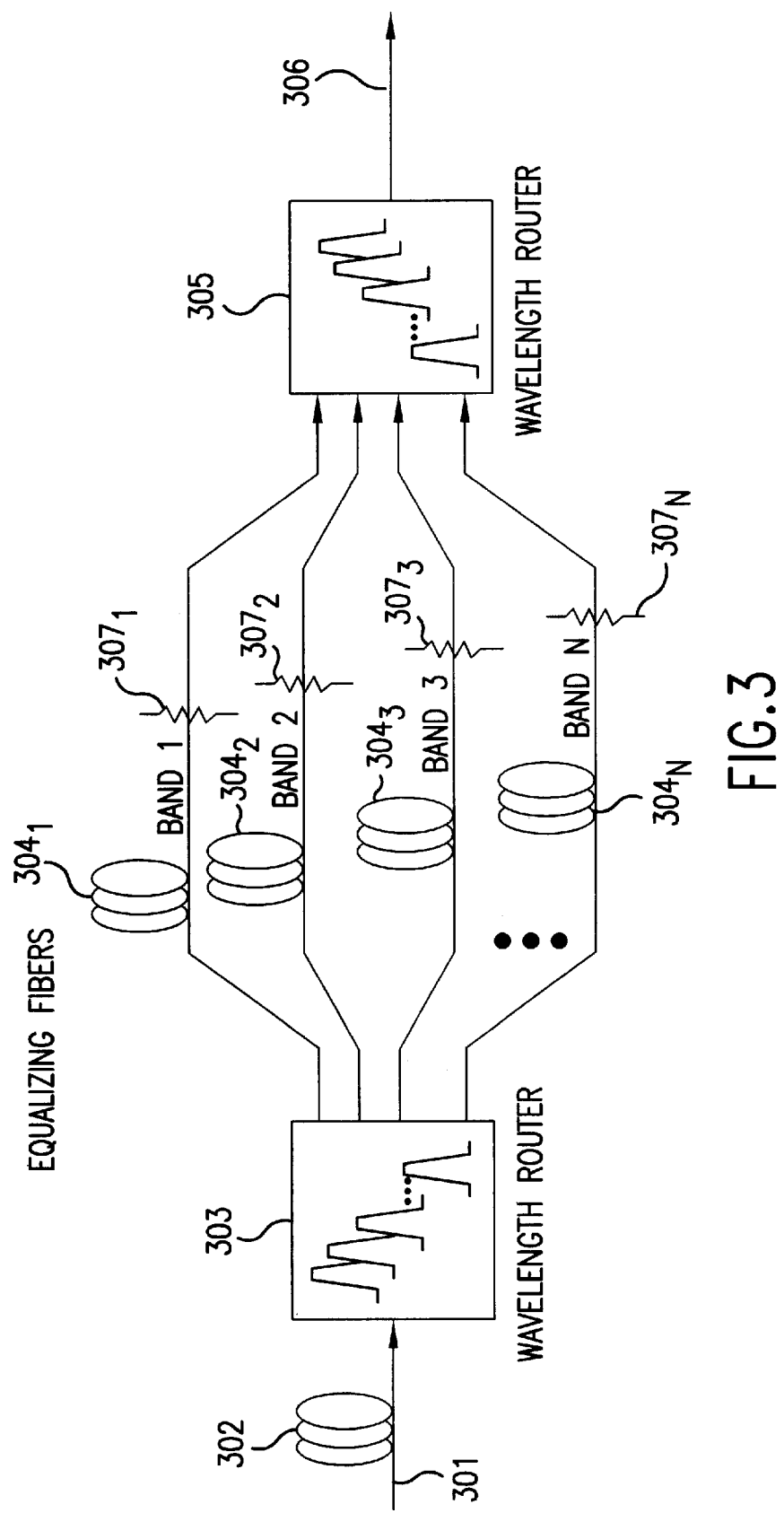
FIG. 3 shows a simplified block diagram of another embodiment of the invention employing wavelength routing devices

FIG. 3 shows an alternative embodiment of the invention in which the functions performed by the optical splitter 203 and bandpass filters 204 in the FIG. 2 embodiment are performed by a wavelength routing device 303 such as disclosed in U.S. Pat. Nos. 5,002,350 and 5,412,744 to Dragone, for example. Similarly, the optical coupler 206 also may be replaced with a wavelength routing device 305. In FIG. 3, signals are directed to optional first dispersion compensating fiber 302 on fiber 301 before entering wavelength routing device 303. The wavelength routing device 303 divides the incoming signals into N output bands, which are each directed to a respective dispersion equalizing fiber $304_1$, $304_2$, $304_3$, . . . $304_N$. The dispersion compensated signals enter respective loss element $307_1$, $307_2$, $307_3$, . . . $307_N$ (if employed) before being recombined in wavelength routing device 305 and emerging on fiber 306.

Figure 4:
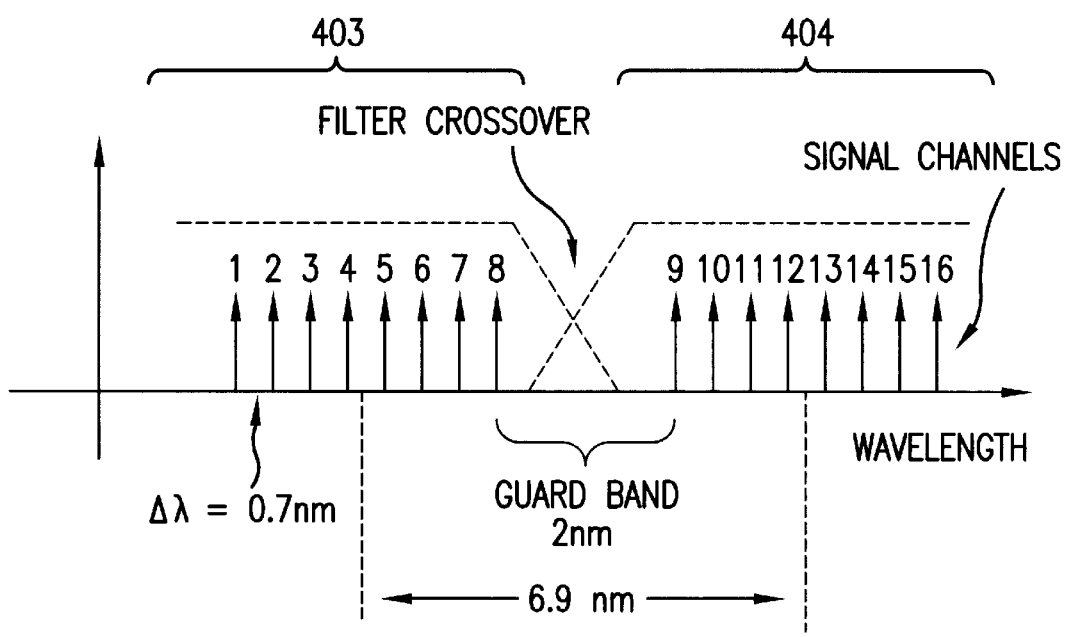
FIG. 4 shows the wavelength allocations for a dispersion compensator that divides the signal into two wavebands.

FIG. 4 shows the allocation of wavelengths for an embodiment of the invention in which a signal comprising sixteen WDM channels is divided into two wavebands. FIG. 4 shows the lower and upper wavebands 403 and 404 into which the signal is divided. Sixteen 10 Gb/s channels are divided into an "upper" band and a "lower" band. The eight channels within each band are separated by 0.7 nm. A 2 nm guard band is provided between the upper and lower bands, which allows for a transition region in the multiplexing and de-multiplexing devices.

Figure 5:
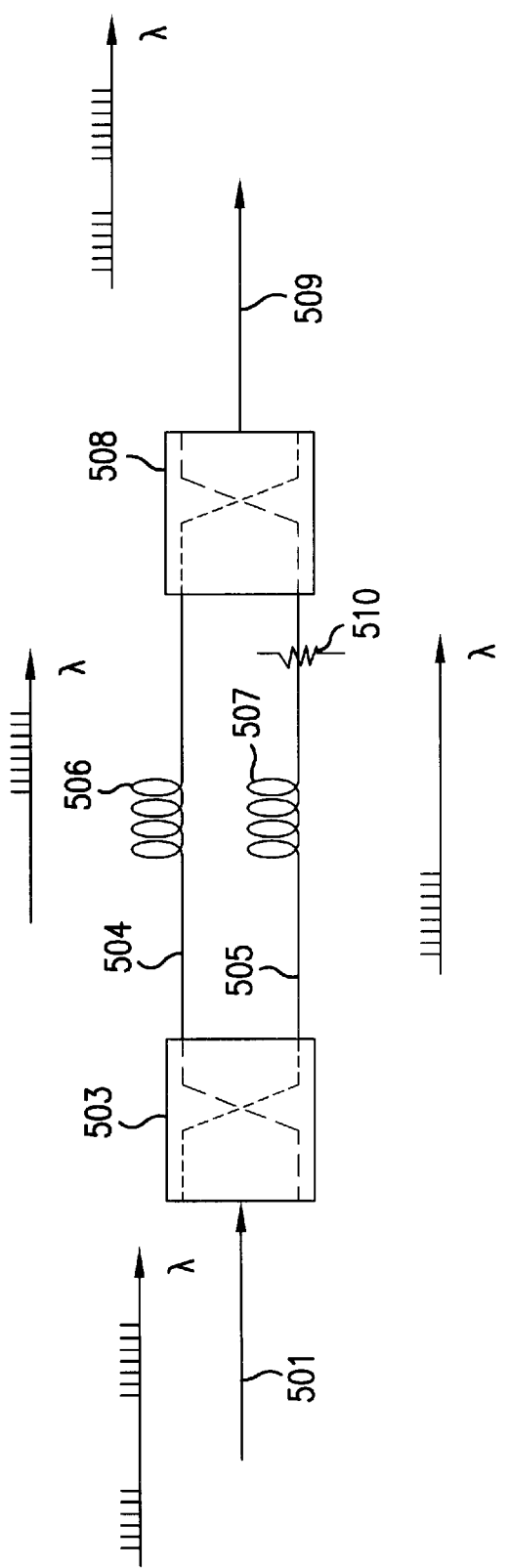
FIG. 5 shows a block diagram of the dispersion compensator employed in FIG. 4.

FIG. 5 shows the structure of the two band dispersion compensator that is used in connection with FIG. 4. This dispersion compensator employs readily available optical fibers with different dispersions. The different dispersion shifted optical fibers that are currently commercially available include the so-called DCF fiber, Z-fiber (i.e., pure silica core fiber), and TRUEWAVE®MINUS™ fiber. The DCF fiber has a dispersion per unit length of about −80 to −100 ps/km-nm, the Z-fiber has a dispersion per unit length of about +19 ps/km-nm, and the TRUEWAVE® fiber has a dispersion per unit length of −2 ps/km-nm. Another parameter characterizing the dispersion shifted fibers is a figure of merit denoting the dispersion per unit of optical loss. For example, the DCF fiber has a figure of merit greater than the figure of merit of the Z-fiber (about −160 ps/nm/dB versus about 100 ps/nm/dB).

Referring again to FIG. 5, signals enter a common fiber 501. The signals are then directed to wavelength routing device 503, which divides the two wavebands onto fibers 504 and 505. The lower band channels 1–8 are directed to equalizing fiber 507, which comprises 43 km of Z-fiber and thus has a total dispersion of about 817 ps/nm (43 km×+19 ps/km-nm). The higher band channels 9–16 are directed on path 504 to equalizing fiber 506, which comprises 14.6 km of DCF fiber having a dispersion per unit length of −95 ps/km-nm. The total dispersion of equalizing fiber 506 is thus −1387 ps/nm (14.6 km×−95 ps/km-nm). The high and low bands are then recombined in wavelength dependent coupler 508 onto a common path 509. It is anticipated that the extinction ratio of wavelength dependent couplers 503 and 508 will be sufficiently large such that signals traveling through unwanted paths would be at a low enough level to minimize the impact of any interference effects on the system's end-to-end performance.

Since as noted above the two types of dispersion equalizing fiber have different figures of merit, the loss in equalizing fiber 506 may be different than the loss in equalizing fiber 507. As previously mentioned, the loss between the upper and lower wavebands may be equalized by inserting a separate loss element 510 in fiber 505. Alternatively, the loss may be equalized by increasing the length of equalizing fiber 507, eliminating the need for a distinct loss element. This extra length may, for example, be located in the repeater housing. This approach is particularly advantageous because by increasing the length of equalizing fiber 507, the differential dispersion between the lower and upper wavebands is increased. Of course, the present invention also contemplates the use of both a distinct loss element and an increased length of the equalizing fiber having the smaller figure of merit (e.g., equalizing fiber 507 in the FIG. 5 embodiment).

In some embodiments of the invention it may be advantageous to incorporate the dispersion equalizer 105 shown in FIG. 1 into the repeater which houses the adjacent optical amplifier 103 (or in a bi-directional system an amplifier pair). In an undersea communication system, this arrangement minimizes the number of hermetically-sealed housings that must be deployed. In some alternative embodiments of the invention, however, it may be advantageous to deploy the dispersion equalizer 105 outside of the repeater. When disposed outside the repeater, the dispersion compensating fibers may function as a span of the transmission path that contributes to traversing the distance between the transmitting and receiving terminals. That is, the dispersion compensating fibers provide additional path length. In contrast, when the dispersion equalizer 105 is located within a repeater, it simply adds excess length without covering any distance.

In some embodiments of the invention it may be advantageous if the dispersion equalizing fiber located within a repeater housing is arranged to traverse the housing at least twice, thus, reducing the required fiber length. If such an arrangement were employed, the dispersion compensating fiber would be surrounded by a circulator and a Faraday rotator mirror. This would also have the added benefit of reducing any residual polarization dependence in the fiber, such as polarization mode dispersion.

Spans of the transmission path between repeaters typically comprise optical fiber located in a cable sheath that serves to protect the optical fibers and any electrical power lines that also may be supported therein. When the dispersion equalizer is located outside the repeaters, special sections of cable must be provided that will accommodate the dispersion compensating fibers. The special cable sections must be capable of housing N dispersion compensating fibers corresponding to the N bands into which the optical signal is divided by the dispersion equalizer.

One problem associated with the use of high negative dispersion fiber is that such fiber inherently has a smaller effective cross-sectional area than a negative dispersion fiber having a smaller relative magnitude. Thus, DCF fiber (with a dispersion of about −100 ps/km-nm) has a smaller cross-sectional area than TRUEWAVE® fiber (with a dispersion of about −2 ps/km-nm). As a result, the power intensity will be greater in the DCF fiber than in the TRUEWAVE® fiber, thus increasing nonlinearities in the DCF fiber.

Figure 6:
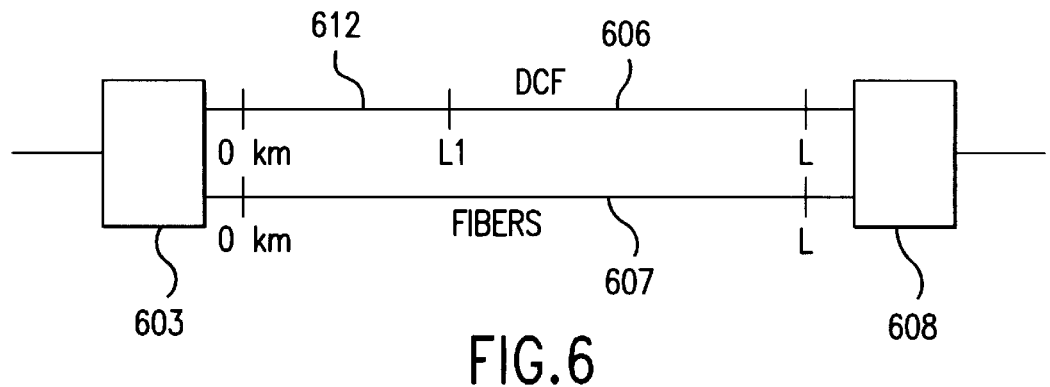
FIG. 6 shows a particular embodiment of the dispersion compensator of FIG. 5.
Figure 7:
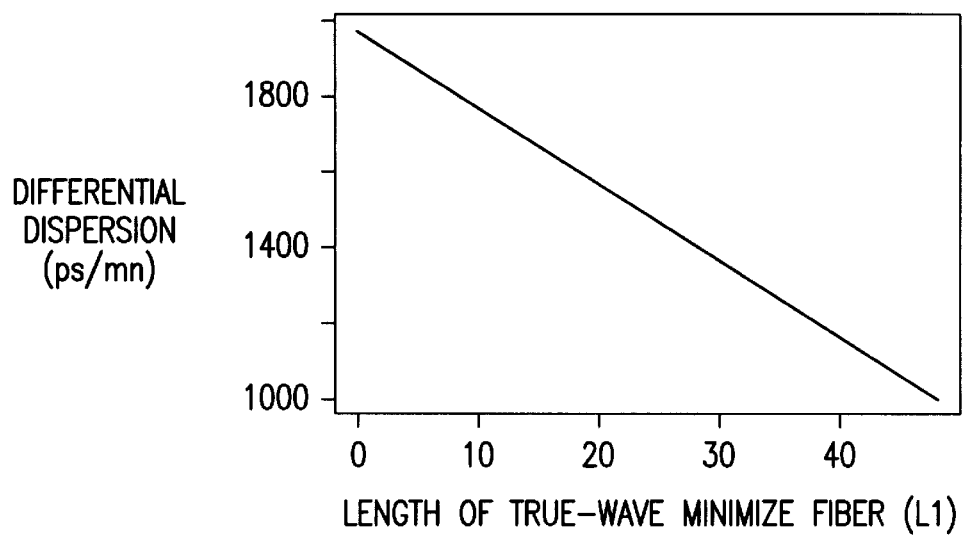
FIG. 7 shows the differential dispersion between the upper and lower bands for the dispersion compensator shown in FIG. 6 as a function of the length of TRUEWAVE® fiber.

In the embodiment of the invention shown in FIG. 5, nonlinearities may be reduced by replacing a portion of DCF fiber 506 with TRUEWAVE® fiber. FIG. 6 shows such an arrangement in which the upper waveband traverses TRUEWAVE® fiber 612 of length L1 and DCF fiber 606 of length (L-L1) and the lower waveband traverses Z-fiber 607. FIG. 7 shows the differential dispersion between the upper and low wavebands as a function of the length L1 of TRUEWAVE® fiber 612.

Clearly, the differential dispersion is maximized when the length of TRUEWAVE® fiber is zero and is minimized when the length of the TRUEWAVE® fiber is L (i.e., when no DCF fiber 606 is employed). Thus, TRUEWAVE® fiber 612 may be used to reduce nonlinearities, but at the expense of a decrease in the differential dispersion.

The dispersion equalizer shown in FIG. 5 may be employed in a transmission system that has 16 channels transmitting data at a rate of 10 Gb/s. The channel spacing is 0.7 nm with a guard-band of 2 nm. Hybrid spans of fiber are used with an average dispersion slope of 0.09 ps/km-nm-nm. The center of the upper and lower wavebands are separated by 6.9 nm. Accordingly, the differential dispersion between the two bands is (0.09 ps/km-nm-nm)×6.9 nm=0.621 ps/km-nm. FIG. 7 shows that the maximum amount of differential dispersion is 1980 ps/nm, and thus a single dispersion equalizer can correct for dispersion in (1980 ps/nm)/(0.621 ps/km-nm)=3,188 km of the transmission path. Thus, in a system about 9,600 km in length, three such dispersion equalizers may be used, which could be positioned ¼, ½, and ¾ of the way along the system. This would result in the center channels of the upper and lower bands having zero end-to-end accumulated dispersion.

FIG. 8 shows an example of the dispersion map for the previously mentioned transmission system. The figure shows the accumulated dispersion for the center wavelength of the upper and lower wavebands. Because of the fiber's non-zero dispersion slope, the two wavelengths accumulate dispersion at different rates, thus causing the spread in the accumulated dispersion seen in FIG. 8. The period of the dispersion map is 500 km. The difference in dispersion between the two wavelengths after a single period of the dispersion map is 310 ps/nm (500 km×0.621 ps/km-nm). Therefore, after each subsequent period of the dispersion map the difference in dispersion between the two center wavelengths will increase by 310 ps/nm.

In the previously described embodiments of the invention it was assumed that the transmission fiber had a negative dispersion and that the dispersion compensator had a positive dispersion. Of course, those skilled in the art will recognize that the invention alternatively could operate in connection with a transmission fiber having a positive dispersion and a dispersion compensator that has negative dispersion. Moreover, the invention is not limited to signals arranged in an NRZ transmission format. For example, the invention is also applicable to soliton transmission systems, particularly those systems that use sliding frequency-guiding jitter control. In such systems the optical powers should be directly tied to the average chromatic dispersion. The dispersion slope causes the different soliton WDM channels to operate at different optical powers. Accordingly, the present invention may advantageously equalize the optical powers by allowing the channels to operate at similar values of chromatic dispersion. Other soliton systems in which the invention may be advantageously employed include a dispersion managed soliton system in which accumulated jitter is minimized by periodically reducing dispersion with a dispersion equalizer.

What is claimed is:

1. A WDM optical communication system, comprising:
   a transmitter and a receiver;
   an optical fiber transmission path coupling said transmitter to said receiver, said transmission path including at least one repeater having an optical amplifier located therein;
   a dispersion compensator disposed at an intermediate point along said transmission path outside of said repeater, said compensator including:
      a wavelength routing device for dividing a signal having a prescribed bandwidth into a plurality of distinct sub-bands, each said sub-bands comprising a plurality of channels;
      a plurality of output paths for respectively receiving said plurality of distinct sub-bands;
      a dispersion compensating optical element coupled to each of said output paths, said dispersion compensating optical elements each substantially compensating for dispersion of said plurality of channels within said respective sub-bands at prescribed wavelengths within the bandpass of its respective sub-band;
      a coupler for recombining said distinct sub-bands and coupling said recombined distinct sub-bands onto said optical fiber transmission path.

2. The system of claim 1 wherein said transmission path comprises at least one optical fiber and a cable supporting said optical fiber, said cable having a prescribed portion in which said dispersion compensator is located.

3. The system of claim 1 wherein said plurality of distinct sub-bands comprises two distinct sub-bands corresponding to upper and lower bands, said upper and by bands each comprising a plurality of channels.

4. The system of claim 3 wherein said lower band includes a first dispersion equalizing fiber having a positive dispersion.

5. The system of claim 4 wherein the dispersion of said first dispersion equalizing fiber is approximately equal to 19 ps/km-nm.

6. The system of claim 4 wherein said upper band includes a second dispersion equalizing fiber having a negative dispersion.

7. The system of claim 6 wherein the dispersion of the second dispersion equalizing fiber is within a range of about −80 to −100 ps/km-nm.

8. The system of claim 7 wherein said optical fiber transmission path has a path average dispersion of −2.5 ps/km-nm.

9. The system of claim 8 wherein said first dispersion equalizing fiber has a length providing a total dispersion of approximately 817 ps/nm.

10. The system of claim 9 wherein said second dispersion equalizing fiber has a length providing a total dispersion of approximately −1387 ps/nm.

11. The system of claim 6 wherein said first and second dispersion equalizing fibers have first and second lengths, respectively, that provide gain equalization between said upper and lower bands.

12. The system of claim 6 wherein said lower band further comprises a loss element to provide gain equalization between said upper and lower bands.

13. The system of claim 6 wherein said upper band further comprises a third dispersion equalizing fiber having a negative dispersion with a magnitude less than the magnitude of the second dispersion equalizing fiber.

14. The system of claim 13 wherein the dispersion of the third dispersion equalizing fiber is approximately equal to −2 ps/km-nm.

* * * * *